(12) United States Patent
Sun et al.

(10) Patent No.: US 8,837,156 B2
(45) Date of Patent: Sep. 16, 2014

(54) CONTACT TYPE PORTABLE POWER

(71) Applicant: Shenzhen Win-top Electronic Tech Co., Ltd., Guangdong (CN)

(72) Inventors: Zhongwei Sun, Guangdong (CN); Houquan Zhang, Guangdong (CN); Yongli Zhou, Guangdong (CN); Zhuangzhong Yi, Guangdong (CN)

(73) Assignee: Shenzhen Win-Top Electronic Tech Co., Ltd., Guangdong (CN)

( * ) Notice: Subject to any disclaimer, the term of this patent is extended or adjusted under 35 U.S.C. 154(b) by 159 days.

(21) Appl. No.: 13/628,263

(22) Filed: Sep. 27, 2012

(65) Prior Publication Data

US 2013/0314880 A1 Nov. 28, 2013

(30) Foreign Application Priority Data

May 25, 2012 (CN) .......................... 2012 1 0164351

(51) Int. Cl.
*H05K 5/00* (2006.01)
*H05K 7/00* (2006.01)

(52) U.S. Cl.
USPC ... 361/752; 361/679.56; 361/730; 455/575.1; 455/347; 320/114

(58) Field of Classification Search
CPC .................. G06F 1/16–1/1654; G06F 1/1656; G06F 1/1662–1/1681; G06F 1/20; G06F 1/203; G06F 1/206; G06F 2200/201; G06F 2200/202; G06F 2200/203; H05K 5/00; H05K 5/0026; H05K 5/0082; H05K 5/0021; H05K 5/069; H05K 7/20; H05K 7/00; H05K 7/1422; H05K 1/0218–1/0219; H05K 1/00; H05K 3/00; H05K 9/00; H01G 2/00; H01G 4/00; H01G 5/00; H01G 7/00; H01G 9/00–9/155; H01G 11/00; H02G 3/00; H02G 5/00; H02G 7/00; H02G 9/00; H02G 11/00; H02G 13/00; H02G 15/00; H01B 7/00; H01B 11/00; H01B 17/00; H01R 4/00; H01R 9/00; H01R 13/00; H01K 1/00; H01K 3/00; H02B 1/00; H01H 37/00
USPC ............. 361/679.01–679.45, 679.55–679.61, 361/782–821, 679.01–679.02, 361/679.55–679.56, 728–730, 741, 361/748–752; 455/575.1, 550.1, 347; 379/433.01
See application file for complete search history.

(56) References Cited

U.S. PATENT DOCUMENTS 6,982,698 B2 * 1/2006 Shimizu ........................ 345/156
7,519,350 B2 * 4/2009 Yamamoto et al. ........... 455/347

(Continued)

*Primary Examiner* — Zachary M Pape
*Assistant Examiner* — Razmeen Gafur
(74) *Attorney, Agent, or Firm* — Katten Muchin Rosenman LLP

(57) ABSTRACT

The present disclosure includes a protective sleeve assembly and a battery module, wherein the protective sleeve assembly includes a frame and a terminal fixing plate, a terminal circuit board and a connector port are arranged on the terminal fixing plate, an end of a conduction sheet is connected to the terminal circuit board, the other end of the conduction sheet is in a limiting hole of the terminal fixing plate; the battery module includes a upper cover, a lower cover and a charge-discharge control circuit board, a conduction electrode is arranged on the charge-discharge control circuit board and connected with a battery. When the mobile phone is fixed with the protective sleeve assembly, a special port of the mobile phone is transformed into a general port by the conversion circuit of the terminal circuit board, so it's easy to charge the mobile phone by the general port.

11 Claims, 3 Drawing Sheets

(56) References Cited

U.S. PATENT DOCUMENTS

| | | | |
|---|---|---|---|
| 7,620,175 B2* | 11/2009 | Black et al. | 379/444 |
| 7,782,610 B2* | 8/2010 | Diebel et al. | 361/679.56 |
| 2007/0279859 A1* | 12/2007 | Canova et al. | 361/683 |
| 2008/0037770 A1* | 2/2008 | Emmert | 379/433.01 |
| 2009/0310311 A1* | 12/2009 | Kondoh et al. | 361/707 |
| 2010/0258626 A1* | 10/2010 | Watanabe et al. | 235/380 |
| 2011/0096472 A1* | 4/2011 | Rodgers et al. | 361/679.01 |
| 2011/0159324 A1* | 6/2011 | Huang et al. | 429/7 |

* cited by examiner

the present disclosure relates generally to power supplies, and more particularly to a contact type portable power applies to a mobile terminal.

CONTACT TYPE PORTABLE POWER

FIELD OF THE INVENTION

The present disclosure relates generally to power supplies, and more particularly to a contact type portable power applies to a mobile terminal.

BACKGROUND OF THE INVENTION

With the developing of technology, personal consumer electronics such as smartphones become more and more feature-rich. Though the smartphone has many options and functional capabilities available to a user, it need a battery having a lager capacity, otherwise the power of the battery in the smartphone can be used up quickly, which means the battery can't supply a life time long enough. So a rechargeable battery charging for the smartphone in emergency came into being.

A traditional power supply is separated with the smartphone, and the power supply is connected to the smartphone only when it is used, which takes inconvenience to carry the power supply. On the other hand, the exterior of the smartphone becomes more and more exquisite, electronic assemblys of the smartphone become more and more precision, and the smartphone becomes more and more feature-rich. For preventing the shell of the smartphone from scratching while using, and mitigating an influence of an external shock, a protective sleeve for the smartphone is needed. But the protective sleeve can't charge a mobile terminal such as the smartphone, because there is not power supply in the protective sleeve. On the other hand, a mobile power supply or a standby power supply can't protect the smartphone in general. And the mobile power supply and the standby power need to be connected by a cable while using, which takes inconvenience to use and carry the power supply. At present, many of the smartphones have custom protocol ports, when importing/exporting the data or charging the smartphone, we need a cable having a dedicated port in general, which takes inconvenience to use the smartphone.

SUMMARY OF THE INVENTION

The main technical problem solved by the present disclosure is providing a contact type portable power, the contact type portable power can charge the communication terminal conveniently, and has a compact structure which is easy to use and carry.

To solve the technical problem above mentioned, the present disclosure provides a contact type portable power, the contact type portable power includes: a protective sleeve assembly includes a frame and a terminal fixing plate latched with the frame; and a battery module fixed with the protective sleeve assembly and comprising an upper cover, a lower cover and a charge-discharge control circuit board, the charge-discharge control circuit board disposed between the upper cover and the lower cover and electrically connected to a battery; wherein a terminal circuit board, a connector port and a conduction sheet are arranged on the terminal fixing plate, an end of the conduction sheet is electrically connected to the terminal circuit board which has a conversion circuit, the other end of the conduction sheet is in a limiting hole of the terminal fixing plate; and the charge-discharge control circuit board comprising a conduction electrode contacted with the conduction sheet.

Further, the frame defines a latching groove arranged in an inner side thereof, and a tab arranged on the terminal fixing plate engages in the latching groove.

Further, the conduction electrode is a resilient pin or a resilient sheet.

Further, a fixing buckle is arranged on the upper cover, and the fixing buckle is fixed in a fixing hole of the terminal fixing plate.

Further, the fixing hole is substantially 8-shaped or gourd-shaped, a side of the fixing hole has a step structure; and a cross-section of the fixing buckle taken along the centerline thereof is substantially T-shaped or inverted L-shaped.

Further, the conduction sheet is substantially L-shaped and includes a protrusion arranged on an end of the conduction sheet, the height of the protrusion is larger than the depth of the limiting hole, the conduction sheet contacts with the conduction electrode closely when the upper cover is latched with the terminal fixing plate.

Further, the protrusion is substantially N-shaped.

Further, the terminal fixing plate includes a limiting bar fixed in a limit groove of the upper cover.

Further, a charge-discharge switch and an indicator are arranged on the charge-discharge control circuit board, and the charge-discharge switch is disposed on an outer side of the lower cover.

Further, a light guide plate or a light guide post is arranged near the indicator.

Furthermore, it is another object to provide a touch point detecting method.

The present disclosure of the contact type portable power includes the protective sleeve assembly and the battery module, wherein the protective sleeve assembly includes the frame and the terminal fixing plate, the terminal circuit board and the connector port are arranged on the terminal fixing plate, the terminal circuit board which has the conversion circuit is electrically connected to one end of the conduction sheet, the other end of the conduction sheet is in the limiting hole of the terminal fixing plate; the battery module includes the upper cover and the lower cover, the charge-discharge control circuit board is arranged between the upper cover and the lower cover, the charge-discharge control circuit board is electrically connected to the battery which is in a cavity formed by the upper cover and the lower cover, the conduction electrode is arranged on the charge-discharge control circuit board and contacted with the conduction sheet. The frame is latched with the terminal fixing plate to form the protective sleeve assembly while using, and a mobile phone can be protected by the protective sleeve assembly. On the other hand, when the mobile phone is fixed with the protective sleeve assembly, a terminal of the terminal circuit board is connected to the port of the mobile phone, an input signal could be transformed in order to match the mobile phone by the conversion circuit. When a backup battery is needed to charge the mobile phone, the battery module should be latched with the protective sleeve assembly, so the conduction electrode of the battery module is contacted with the conduction sheet closely to form a circuit. The structure of the contact type portable power is simple and compact, the user can change the battery module easily. And because the battery of the battery module is a removable structure, the user can choose batteries having different capacity as needed, so different demands of users can be fit.

DETAILED DESCRIPTION OF THE EMBODIMENTS

Figure 1:
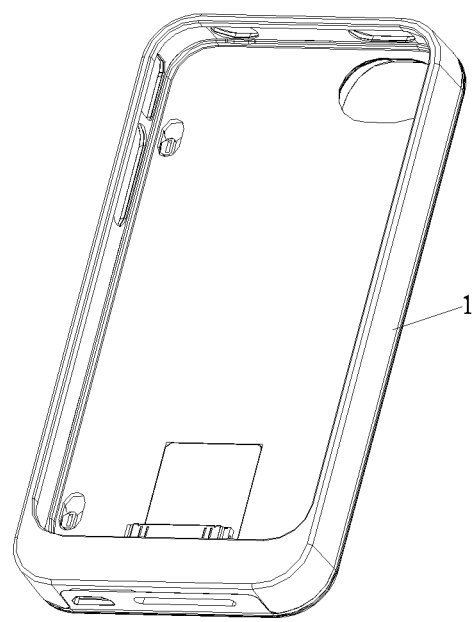
FIG. 1 is a schematic diagram of structure of a contact type portable power with an embodiment of the present disclosure.
Figure 2:
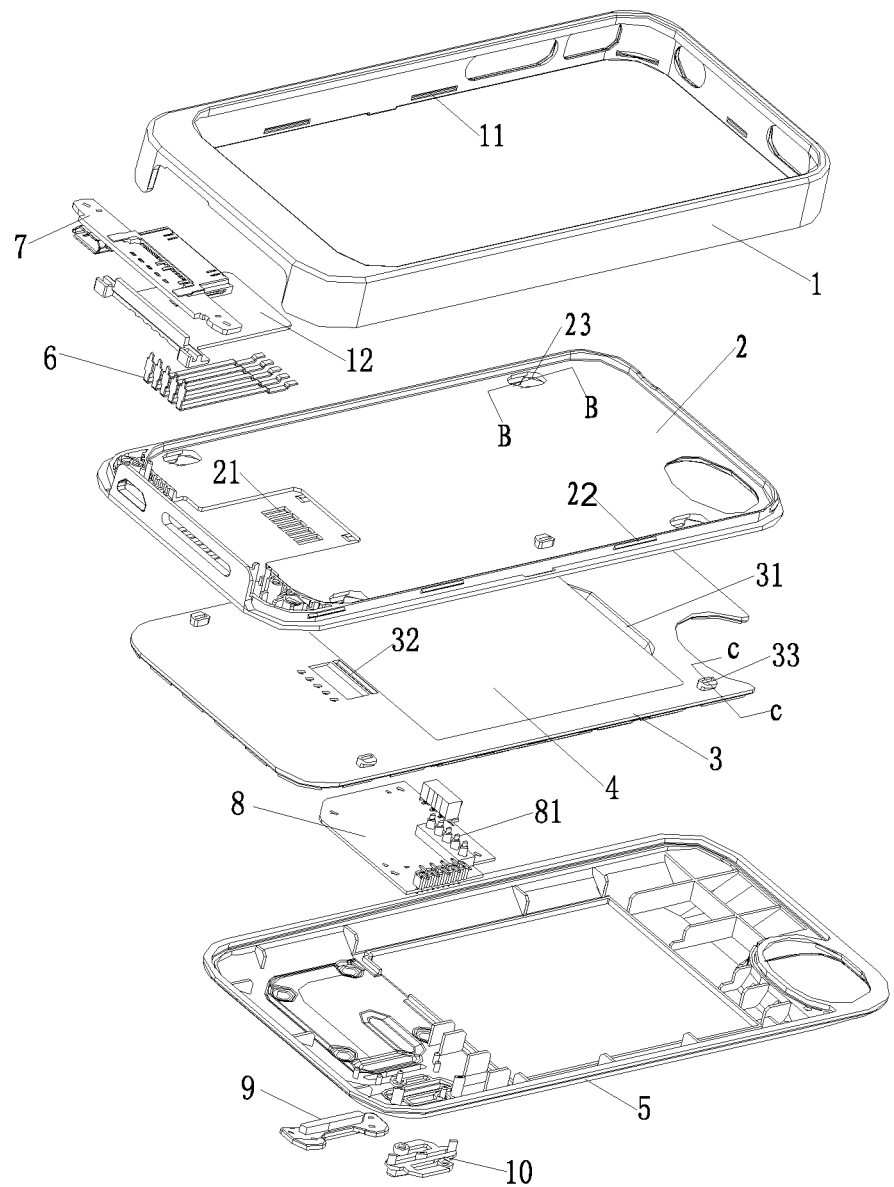
FIG. 2 is an exploded view of the contact type portable power with an embodiment of the present disclosure.
Figure 3:
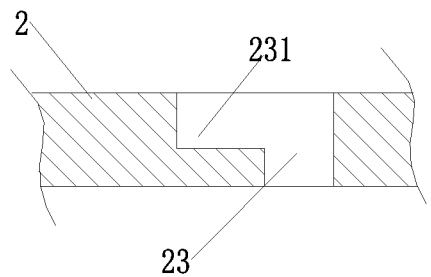
FIG. 3 is a cross sectional view taken along the line B-B of FIG. 2.
Figure 4:
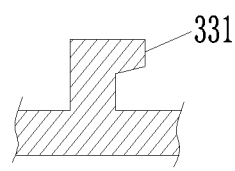
FIG. 4 is a cross sectional view taken along the line C-C of FIG. 2.

The detailed description of the present invention will be discussed in the following embodiments, which are not intended to limit the scope of the present invention, but still can be adapted for other applications. While drawings are illustrated in details, it is appreciated that the quantity of the disclosed assemblies could be greater or less than that disclosed, except those assemblies with expressly restricting amount.

As shown in FIG. 1, FIG. 2, FIG. 3 and FIG. 4, the present disclosure provides an embodiment of a contact type portable power.

The contact type portable power includes: a protective sleeve assembly and a battery module fixed with the protective sleeve assembly, wherein the protective sleeve assembly includes a frame 1 and a terminal fixing plate 2 latched with the frame 1, a terminal circuit board 7, a connector port and a conduction sheet 6 are arranged on the terminal fixing plate 2, an end of the conduction sheet 6 is electrically connected to the terminal circuit board 7 which has a conversion circuit, the other end of the conduction sheet 6 is in a limiting hole 21 of the terminal fixing plate 2; the battery module includes an upper cover 3, a lower cover 5, and a charge-discharge control circuit board 8, the charge-discharge control circuit board 8 disposed between the upper cover 3 and the lower cover 5 and is electrically connected to a battery 4, a conduction electrode 81 contacted with the conduction sheet 6 is arranged on the charge-discharge control circuit board 8.

Specifically, the frame 1 is latched with the terminal fixing plate 2, the terminal circuit board 7 and the connector port connected to the conversion circuit are arranged on the terminal fixing plate 2; the charge-discharge control circuit board 8 is electrically connected to the battery 4, the battery 4 is stored in a cavity formed by the upper cover 3 and the lower cover 5, the conduction electrode 81 contacted with the conduction sheet 6 is arranged on the charge-discharge control circuit board 8, the conduction electrode 81 passes through a through hole of the upper cover 3, and extends to expose a little from the surface of the upper cover 3, the conduction electrode 81 can be a resilient pin structure or a resilient sheet structure.

A latching groove 11 is arranged in an inner side of the frame 1, a tab 22 is arranged on the terminal fixing plate 2, the tab 22 is latched with the latching groove 11. Because fixing the terminal fixing plate 2 with the frame 1 by latching, it's easy to disassemble.

A fixing buckle 33 is arranged on the upper cover 3, the fixing buckle 33 is fixed in a fixing hole 23 of the terminal fixing plate 2. The fixing hole 23 is substantially 8-shaped or gourd-shaped, a side of the fixing hole 23 has a step structure 231; and a cross-section of the fixing buckle 33 taken along the centerline thereof is substantially T-shaped or inverted L-shaped, which means a protrusion 331 is arranged on the top of the fixing buckle 33.

The frame is latched with the terminal fixing plate to form the protective sleeve assembly while using, and a mobile phone can be protected by the protective sleeve assembly. On the other hand, when the mobile phone is fixed with the protective sleeve assembly, a special port of the mobile phone is transformed into a general port by the conversion circuit, so it's easy to charge the mobile phone by the general port even if a user doesn't have a cable with the special port of the mobile phone. When a backup battery is needed to charge the mobile phone, the battery module should be latched with the protective sleeve assembly, so the conduction electrode of the battery module is contacted with the conduction sheet closely to form a circuit. The structure of the contact type portable power is simple and compact, so the user can change the battery module easily. And because the battery of the battery module is a removable structure, the user can choose batteries having different capacity as needed, so different demands of users can be fit.

In this embodiment, the frame 1 is fixed with the terminal fixing plate 2 by latching, for example, the latching groove 11 is arranged in the inner side of the frame 1, the tab 22 is arranged on the terminal fixing plate 2, the tab 22 is latched with the latching groove 11. There are also other structures which are easy to disassemble could be used to fix the frame 1 with the terminal fixing plate 2 in other embodiments. The terminal fixing plate 2 can also be fixed with the upper cover 3 by other structures which are easy to disassemble, such as slipping buckles, suckers, magnets, latching buckles, hasp and so on.

Figure 5:
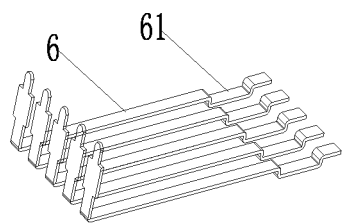
FIG. 5 is a schematic diagram of structure of a conduction sheet with an embodiment.

As shown in FIG. 5, the conduction sheet 6 is substantially L-shaped, a protrusion 61 is arranged on one end of the conduction sheet 6, the height of the protrusion is larger than the depth of the limiting hole 21, when the upper cover 3 is latched with the terminal fixing plate 2, the conduction sheet 6 contacts with the conduction electrode 81 closely. The protrusion 61 is substantially N-shaped, which takes a lager contact area between the conduction electrode 81 and the conduction sheet 6 to avoid forming open circuit.

An opening 31 can be defined in the upper cover 3, which takes convenient to change the battery 4. A limiting bar (not shown in drawings) is arranged on the terminal fixing plate 2, the limiting bar is fixed in a limit groove 32 of the upper cover 3 when the upper cover 3 is latched with the terminal fixing plate 2, so there is a friction between the upper cover 3 and the terminal fixing plate 2 avoiding the upper cover 3 being separated from the terminal fixing plate 2.

In the embodiment above mentioned, a charge-discharge switch (not shown in Drawings) and an indicator (not shown in Drawings) can be arranged on the charge-discharge control circuit board 8, the contact type portable power also includes a button 10 coordinated with the charge-discharge switch and a light guide plate 9 (or light guide post) coordinated with the indicator, wherein the charge-discharge switch is on an outer side of the lower cover 5. Because of the charge-discharge switch, the user can charge/discharge a mobile terminal easily, the light guide plate 9 (or light guide post) is helpful to export a directive light, which can help the user to judge and operate.

Although the present invention has been described with reference to the embodiments thereof and the best modes for carrying out the present invention, it is apparent to those skilled in the art that a variety of modifications and changes may be made without departing from the scope of the present invention, which is intended to be defined by the appended claims.

What is claimed is:

1. A contact type portable power, comprising: a protective sleeve assembly comprising a frame and a terminal fixing plate latched with the frame; and a battery module fixed with the protective sleeve assembly and comprising an upper cover, a lower cover and a charge-discharge control circuit board, the charge-discharge control circuit board disposed between the upper cover and the lower cover and electrically connected to a battery; wherein a terminal circuit board, a connector port and a conduction sheet are arranged on the terminal fixing plate, an end of the conduction sheet is electrically connected to the terminal circuit board which has a conversion circuit, the other end of the conduction sheet is in a limiting hole of the terminal fixing plate; and the charge-discharge control circuit board comprising a conduction electrode contacted with the conduction sheet, wherein the conduction electrode is a resilient in or a resilient sheet, wherein the conduction sheet is substantially L-shaped and comprises a protrusion arranged on an end of the conduction sheet, the height of the protrusion is larger than the depth of the limiting hole, the conduction sheet contacts with the conduction electrode closely when the upper cover is latched with the terminal fixing plate.

2. The contact type portable power according to claim 1, wherein the frame defines a latching groove arranged in an inner side thereof, and a tab arranged on the terminal fixing plate engages in the latching groove.

3. The contact type portable power according to claim 1, wherein a fixing buckle is arranged on the upper cover, and the fixing buckle is fixed in a fixing hole of the terminal fixing plate.

4. The contact type portable power according to claim 3, wherein the fixing hole is substantially 8-shaped or gourd-shaped, a side of the fixing hole has a step structure; and a cross-section of the fixing buckle taken along the centerline thereof is substantially T-shaped or inverted L-shaped.

5. The contact type portable power according to claim 1, wherein the protrusion is substantially N-shaped.

6. The contact type portable power according to claim 1, wherein the terminal fixing plate comprises a limiting bar fixed in a limit groove of the upper cover.

7. The contact type portable power according to claim 5, wherein the terminal fixing plate comprises a limiting bar fixed in a limit groove of the upper cover.

8. The contact type portable power according to claim 1, wherein a charge-discharge switch and an indicator are arranged on the charge-discharge control circuit board, and the charge-discharge switch is disposed on an outer side of the lower cover.

9. The contact type portable power according to claim 5, wherein a charge-discharge switch and an indicator are arranged on the charge-discharge control circuit board, and the charge-discharge switch is disposed on an outer side of the lower cover.

10. The contact type portable power according to claim 8, wherein a light guide plate or a light guide post is arranged near the indicator.

11. The contact type portable power according to claim 9, wherein a light guide plate or a light guide post is arranged near the indicator.

* * * * *